United States Patent
Min et al.

(10) Patent No.: US 11,358,556 B2
(45) Date of Patent: Jun. 14, 2022

(54) ROOF AIRBAG APPARATUS

(71) Applicant: HYUNDAI MOBIS CO., LTD., Seoul (KR)

(72) Inventors: Byung Ho Min, Yongin-si (KR); Kyu Sang Lee, Yongin-si (KR); Choong Ryung Lee, Yongin-si (KR); Hae Kwon Park, Yongin-si (KR); Dong Oh Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/136,511

(22) Filed: Dec. 29, 2020

(65) Prior Publication Data

US 2021/0237675 A1 Aug. 5, 2021

(30) Foreign Application Priority Data

Jan. 31, 2020 (KR) .................. 10-2020-0011510

(51) Int. Cl.
*B60R 21/213* (2011.01)
*B60R 21/2334* (2011.01)
*B60R 21/231* (2011.01)

(52) U.S. Cl.
CPC ........ *B60R 21/213* (2013.01); *B60R 21/2334* (2013.01); *B60R 2021/23192* (2013.01)

(58) Field of Classification Search
CPC ........ B60R 21/213; B60R 2021/23192; B60R 2021/0213
See application file for complete search history.

(56) References Cited

U.S. PATENT DOCUMENTS

| | | | | |
|---|---|---|---|---|
| 4,536,008 A * | 8/1985 | Brown, Jr. | ............ | B60R 21/213 280/736 |
| 10,427,637 B2 * | 10/2019 | Raikar | ........ | B60J 7/02 |
| 10,449,923 B2 * | 10/2019 | Son | ........ | B60R 21/233 |
| 10,471,924 B2 * | 11/2019 | Min | ........ | B60R 21/214 |
| 10,556,564 B2 * | 2/2020 | Lee | ........ | B60R 21/231 |
| 10,604,103 B2 * | 3/2020 | Lee | ........ | B60R 21/2338 |
| 10,604,104 B2 * | 3/2020 | Raikar | ........ | B60R 21/0428 |
| 10,625,705 B2 * | 4/2020 | Min | ........ | B60R 21/214 |
| 10,836,345 B2 * | 11/2020 | Koo | ........ | B60R 21/2334 |
| 11,142,157 B2 * | 10/2021 | Kim | ........ | B60R 21/231 |
| 11,186,246 B2 * | 11/2021 | Min | ........ | B60R 21/232 |
| 11,220,220 B2 * | 1/2022 | Forgette | ........ | B60R 13/0225 |

(Continued)

FOREIGN PATENT DOCUMENTS

CN   205836757 U   * 12/2016   .......... B60R 21/214
CN   112721849 A   *  4/2021

(Continued)

*Primary Examiner* — Nicole T Verley
(74) *Attorney, Agent, or Firm* — DLA Piper LLP (US)

(57) ABSTRACT

A roof airbag apparatus may include: a cushion configured to cover a roof when deployed; a pair of guides having a length in the deployment direction of the cushion, and configured to guide both sides of the cushion in the deployment direction; and a deployment resistance reducer having a connector connected to one end of each of the guides so as to apply an elastic force from a first location toward the rear, wherein the connector is moved to a second location in a front of the first location by frictional resistance which is applied to the guide when the cushion is deployed.

12 Claims, 11 Drawing Sheets

(56) References Cited

U.S. PATENT DOCUMENTS

| | | | |
|---|---|---|---|
| 2007/0013178 A1* | 1/2007 | Aird | B60R 21/26 |
| | | | 280/730.2 |
| 2008/0143146 A1* | 6/2008 | Alagil | B60R 21/13 |
| | | | 296/210 |
| 2017/0267199 A1* | 9/2017 | Schütt | B60R 21/13 |
| 2018/0162315 A1* | 6/2018 | Lee | B60R 21/2346 |
| 2018/0312130 A1* | 11/2018 | Min | B60R 21/214 |
| 2019/0010292 A1* | 1/2019 | Son | B60R 21/202 |
| 2019/0143928 A1* | 5/2019 | Raikar | B60J 7/02 |
| | | | 280/730.1 |
| 2019/0202395 A1* | 7/2019 | Obayashi | B60R 21/231 |
| 2019/0300908 A1* | 12/2019 | Park | B60R 21/214 |
| 2020/0052195 A1* | 2/2020 | Forgette | B60R 13/0205 |
| 2020/0384940 A1* | 12/2020 | Sekizuka | B60R 21/01554 |
| 2021/0138987 A1* | 5/2021 | Lee | B60R 21/213 |
| 2021/0138990 A1* | 5/2021 | Min | B60R 21/20 |
| 2021/0155197 A1* | 5/2021 | Jeong | B60R 21/013 |
| 2021/0179003 A1* | 6/2021 | Min | B60R 21/214 |
| 2021/0179004 A1* | 6/2021 | Lee | B60R 21/2334 |
| 2021/0300280 A1* | 9/2021 | Young | B60R 21/013 |

FOREIGN PATENT DOCUMENTS

| | | | | | |
|---|---|---|---|---|---|
| CN | 113147057 A | * | 7/2021 | | B60R 21/214 |
| DE | 19803164 A1 | * | 7/1999 | | B60R 21/214 |
| DE | 19853479 A1 | * | 8/1999 | | B60J 7/0015 |
| DE | 19851469 A1 | * | 5/2000 | | B60J 1/2022 |
| DE | 202019000013 U1 | * | 3/2019 | | B60R 21/213 |
| DE | 202019106027 U1 | * | 12/2019 | | B60J 7/043 |
| DE | 202020100020 U1 | * | 3/2020 | | B60R 21/213 |
| DE | 202020107503 U1 | * | 4/2021 | | B60R 21/213 |
| DE | 202021101051 U1 | * | 4/2021 | | B60R 21/214 |
| DE | 102020204899 A1 | * | 6/2021 | | B60N 2/14 |
| EP | 0897836 A1 | * | 2/1999 | | |
| JP | 2020196383 A | * | 12/2020 | | B60R 21/0132 |
| KR | 20170031406 A | * | 3/2017 | | |
| KR | 20170034249 A | * | 3/2017 | | |
| KR | 20170049651 A | * | 5/2017 | | |
| KR | 20200086023 A | * | 7/2020 | | |
| KR | 20210113523 A | * | 9/2021 | | |

\* cited by examiner

ROOF AIRBAG APPARATUS

CROSS-REFERENCE TO RELATED APPLICATION

This application claims priority from and the benefit of Korean Patent Application No. 10-2020-0011510, filed on Jan. 31, 2020, which is hereby incorporated by reference for all purposes as if set forth herein.

BACKGROUND

Field

Exemplary embodiments of the present disclosure relate to a roof airbag apparatus, and more particularly, to a roof airbag apparatus capable of preventing damage to a guide when a cushion is deployed.

Discussion of the Background

In general, a vehicle includes an airbag apparatus installed for a passenger's safety. In addition, a roof airbag apparatus is installed at a panorama roof which is positioned at the ceiling of the vehicle.

Such a roof airbag apparatus includes a cushion which is inflated and deployed to prevent a passenger from being injured or thrown out of the vehicle to the outside, in case of a rollover accident of the vehicle. At this time, the cushion is inflated by gas introduced from a gas supply unit (inflator) and blocks the roof space.

Furthermore, the roof airbag apparatus includes a guide for guiding the cushion in the deployment direction, and a guide ring is coupled to the cushion so as to slide the cushion along the guide.

In the conventional roof airbag apparatus, however, the frictional resistance between the guide ring and the guide is increased by the cushion which is contracted when the airbag is deployed, and the guide may be deformed and damaged by the deployment force of the cushion.

SUMMARY

Various embodiments are directed to a roof airbag apparatus capable of preventing damage to a guide when a cushion is deployed.

In an embodiment, a roof airbag apparatus may include: a cushion configured to cover a roof when deployed; a pair of guides having a length in the deployment direction of the cushion, and configured to guide both sides of the cushion in the deployment direction; and a deployment resistance reducer having a connector connected to one end of each of the guides so as to apply an elastic force from a first location toward the rear, wherein the connector is moved to a second location in a front of the first location by frictional resistance which is applied to the guide when the cushion is deployed.

The deployment resistance reducer may apply a restoring elastic force toward the rear such that the connector is restored from the second location to the first location.

The deployment resistance reducer may have a fixed rear end and a front end connected to one end of the guide, and apply a tensile elastic force toward the rear.

The length of the deployment resistance reducer may be increased toward the front when the cushion is deployed, and restored to the original length by the tensile elastic force when the cushion is completely deployed.

The deployment resistance reducer may be disposed in a guide housing whose front is open.

The guide housing may further include an impact absorption layer formed therein, the impact absorption layer being made of an elastic material.

The deployment resistance reducer may have a fixed front end and a rear end connected to one end of the guide, and apply a compressive elastic force toward the rear.

The length of the deployment resistance reducer may be decreased toward the front when the cushion is deployed, and restored to the original length by the compressive elastic force when the cushion is completely deployed.

The deployment resistance reducer may be disposed in a guide housing, while the front end thereof is supported.

A locking member may be locked to a rear end of the deployment resistance reducer so as to move in a front-to-rear direction, and the guide may have one end connected to the locking member through the deployment resistance reducer.

The guide housing may further include an impact absorption layer formed therein, the impact absorption layer being made of an elastic material.

The cushion may further include guide rings which are disposed on either side of the cushion so as to slidable along the guide.

In accordance with the embodiments of the present disclosure, the roof airbag apparatus may reduce the frictional resistance between the guide and the guide ring when the cushion is deployed, thereby prevent damage to the guide due to the contraction of the cushion. Furthermore, the guide housing and the impact absorption layer may be formed on the outside of the deployment resistance reducer, thereby not only preventing the movement of the deployment resistance reducer, but also reducing noise and impact caused by the movement.

DETAILED DESCRIPTION OF THE ILLUSTRATED EMBODIMENTS

Hereafter, exemplary embodiments of the present disclosure will be described in detail with reference to the accompanying drawings.

The advantages and characteristics of the present invention and a method for achieving the advantages and characteristics will be clarified through the following embodiments which will be described in detail with reference to the accompanying drawings.

However, the present disclosure is not limited by the embodiments to be disclosed below, but may be implemented in various forms. The present embodiments are provided to bring the disclosure of the present to perfection and assist a person skilled in the art to which the present disclosure pertains to complete understand the scope of the present disclosure, and the present disclosure is only defined by the scope of the claims.

Further, in describing the present disclosure, detailed descriptions of related publicly-known arts and the like will be omitted when it is determined that the related publicly-known arts may obscure the subject matter of the present disclosure.

Figure 1:
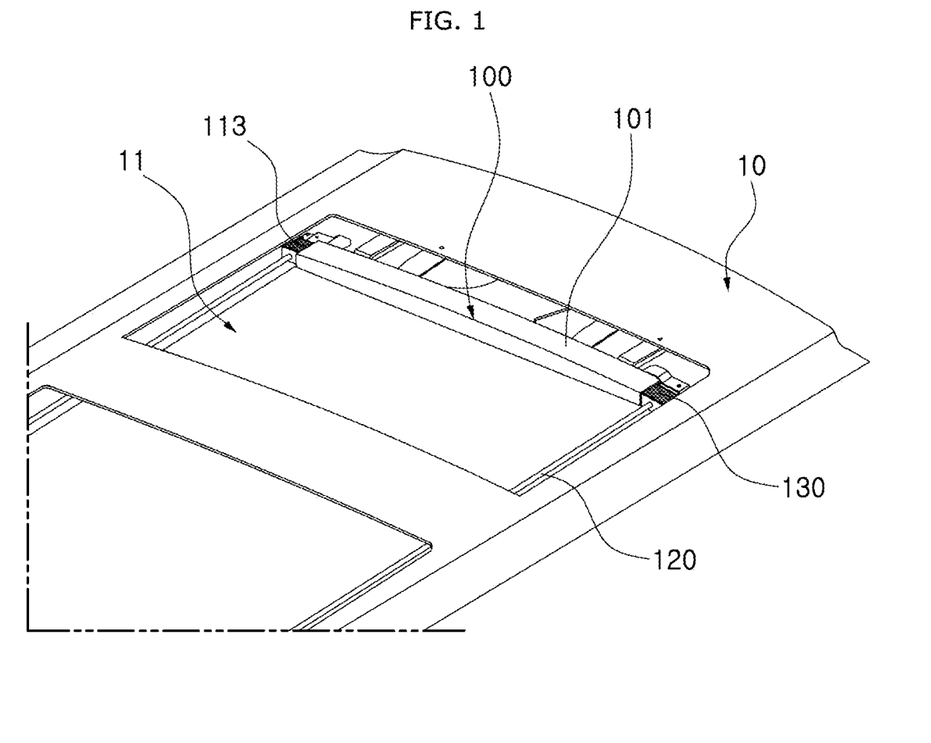
FIG. 1 is a perspective view illustrating that a roof airbag apparatus in accordance with an embodiment of the present disclosure is installed at the roof of a vehicle.
Figure 2:
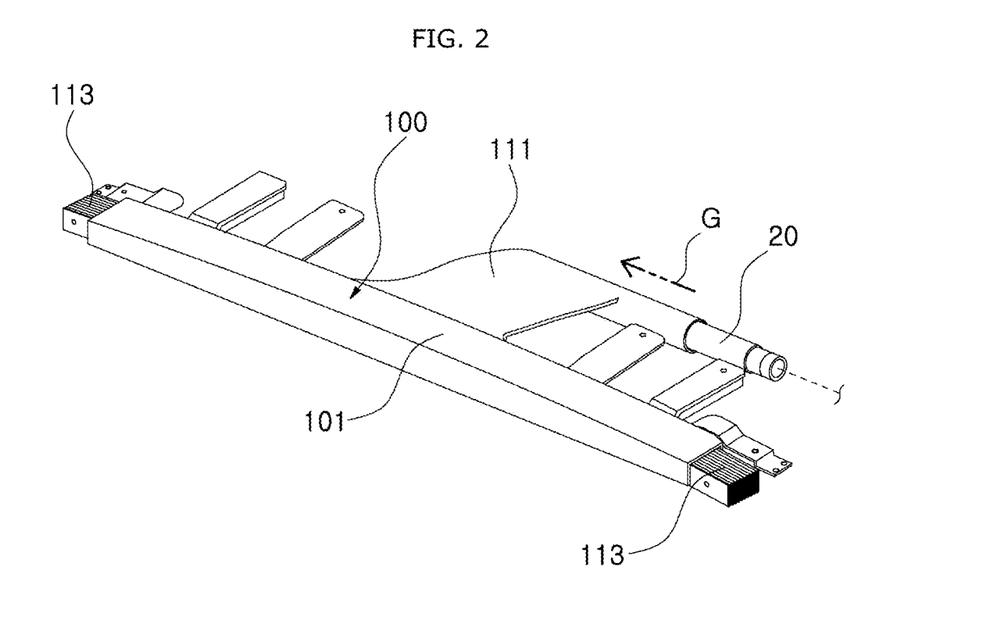
FIG. 2 is a perspective view illustrating the roof airbag apparatus in accordance with the embodiment of the present disclosure.
Figure 3:
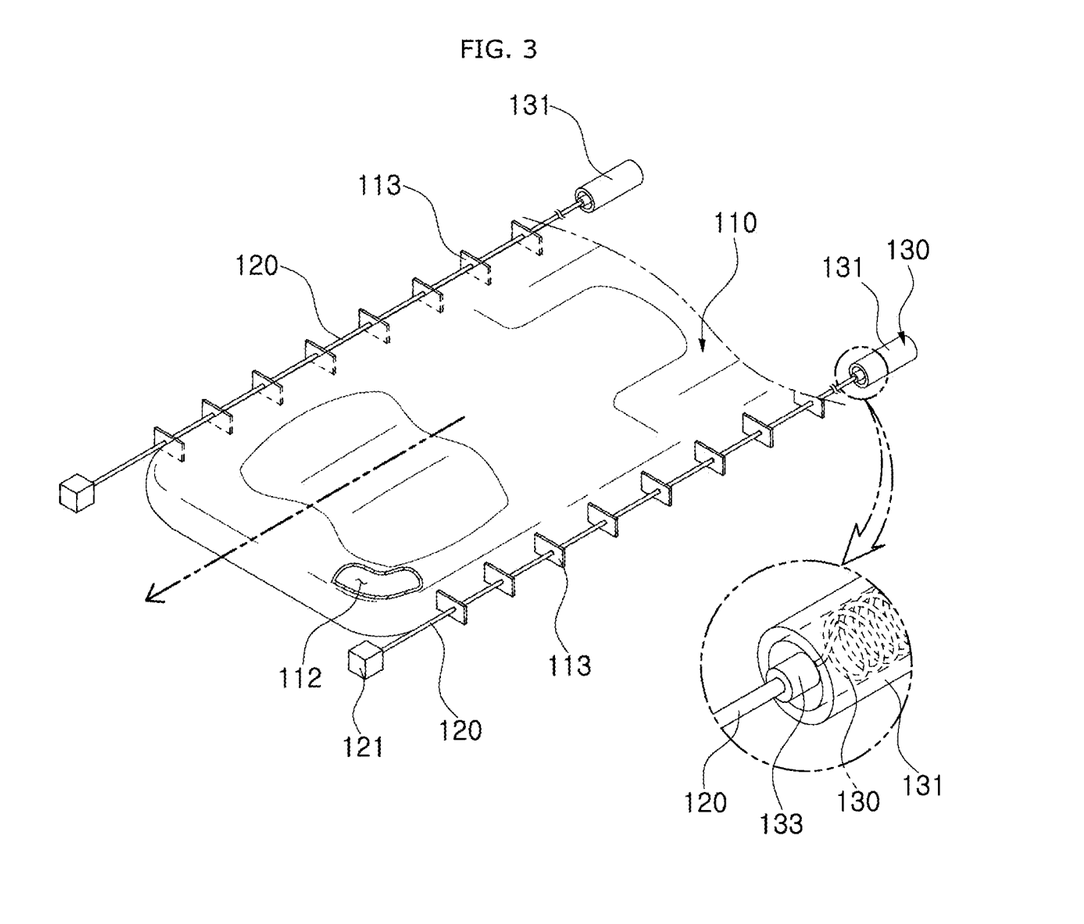
FIG. 3 is a perspective view illustrating that a cushion of the roof airbag apparatus in accordance with the embodiment of the present disclosure is deployed.

FIG. 1 is a perspective view illustrating that a roof airbag apparatus in accordance with an embodiment of the present disclosure is installed at the roof of a vehicle, FIG. 2 is a perspective view illustrating the roof airbag apparatus in accordance with the embodiment of the present disclosure, and FIG. 3 is a perspective view illustrating that a cushion of the roof airbag apparatus in accordance with the embodiment of the present disclosure is deployed.

Figure 4:
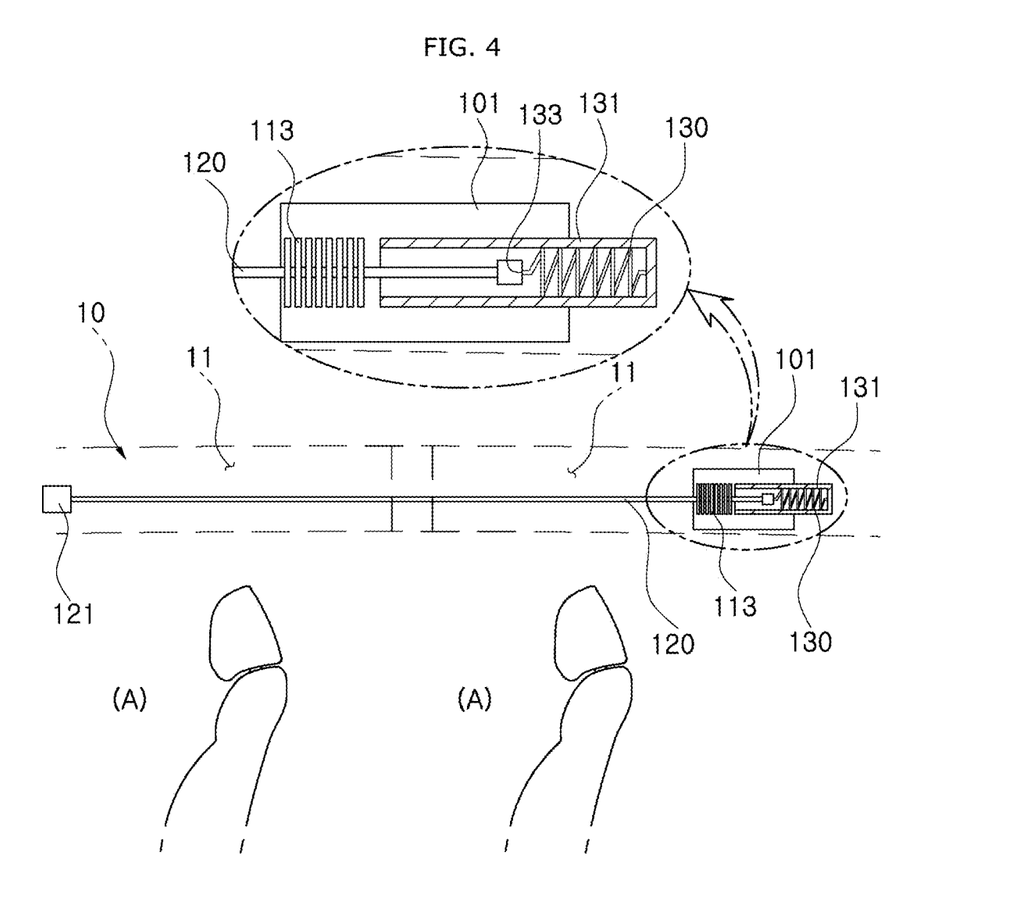
FIG. 4 is a side view illustrating that the length of a deployment resistance reducer is decreased while the cushion of the roof airbag apparatus in accordance with the embodiment of the present disclosure is not deployed.
Figure 5:
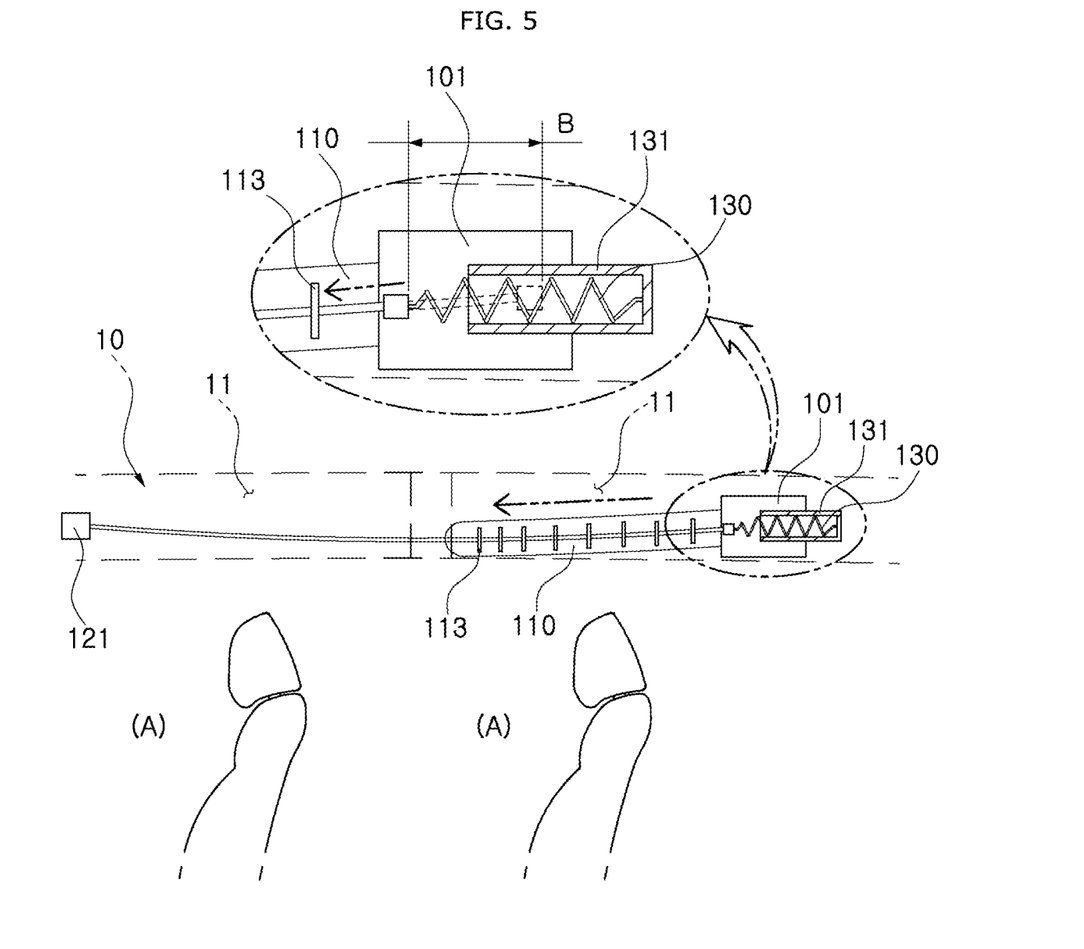
FIG. 5 is a side view illustrating the length of the deployment resistance reducer is increased while the cushion of the roof airbag apparatus in accordance with the embodiment of the present disclosure is deployed.

FIG. 4 is a side view illustrating that the length of a deployment resistance reducer is decreased while the cushion of the roof airbag apparatus in accordance with the embodiment of the present disclosure is not deployed, and FIG. 5 is a side view illustrating the length of the deployment resistance reducer is increased while the cushion of the roof airbag apparatus in accordance with the embodiment of the present disclosure is deployed.

Figure 6:
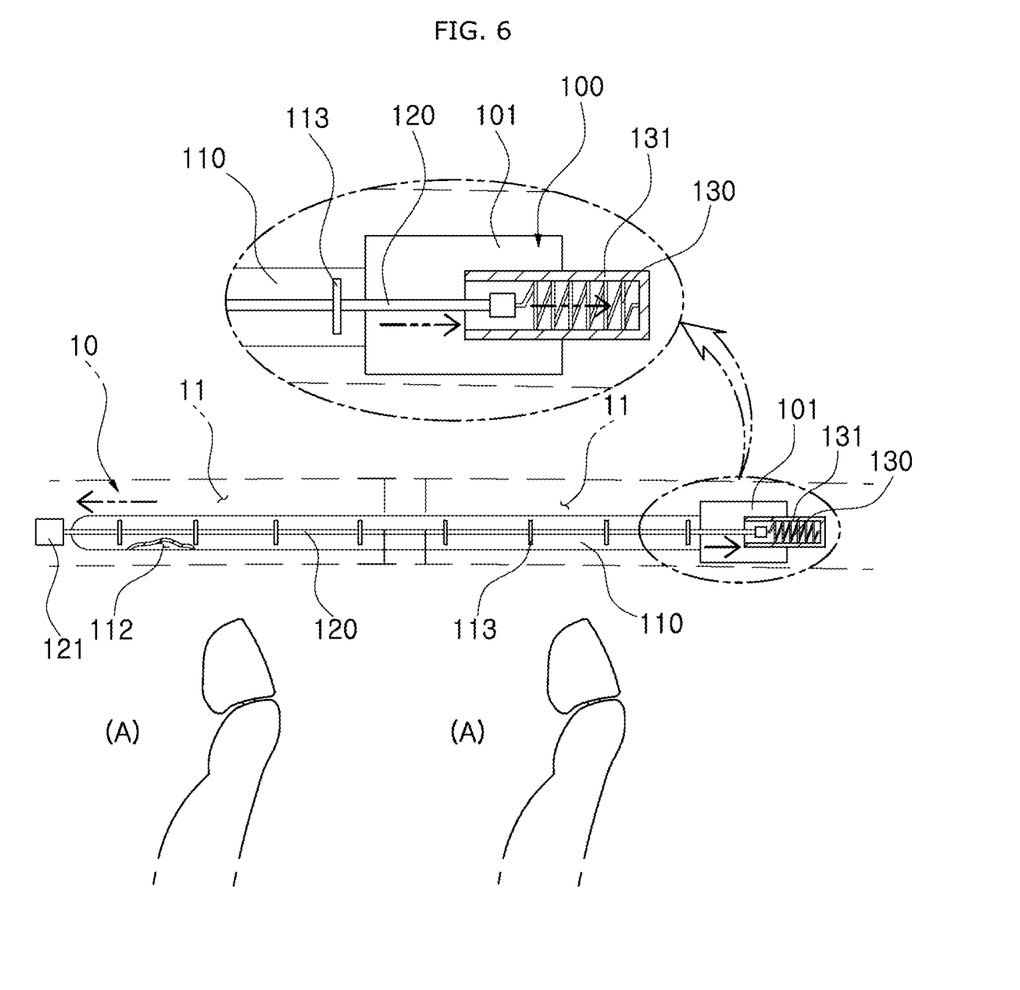
FIG. 6 is a side view illustrating that the length of the deployment resistance reducer is decreased after the cushion of the roof airbag apparatus in accordance with the embodiment of the present disclosure has been completely deployed.
Figure 7:
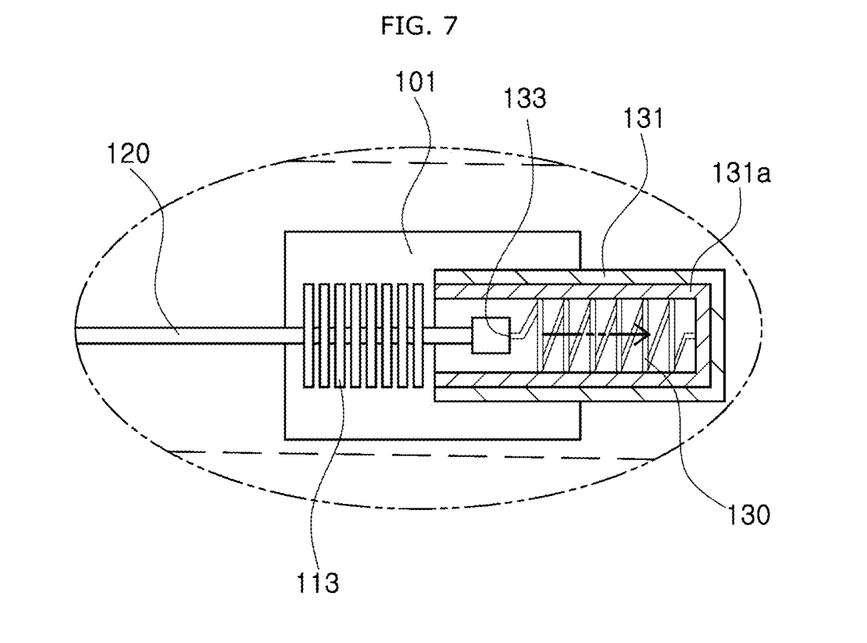
FIG. 7 is a side cross-sectional view illustrating that an impact absorber is formed in a guide housing of the roof airbag apparatus in accordance with the embodiment of the present disclosure.

FIG. 6 is a side view illustrating that the length of the deployment resistance reducer is decreased after the cushion of the roof airbag apparatus in accordance with the embodiment of the present disclosure has been completely deployed, and FIG. 7 is a side cross-sectional view illustrating that an impact absorber is formed in a guide housing of the roof airbag apparatus in accordance with the embodiment of the present disclosure.

Figure 8:
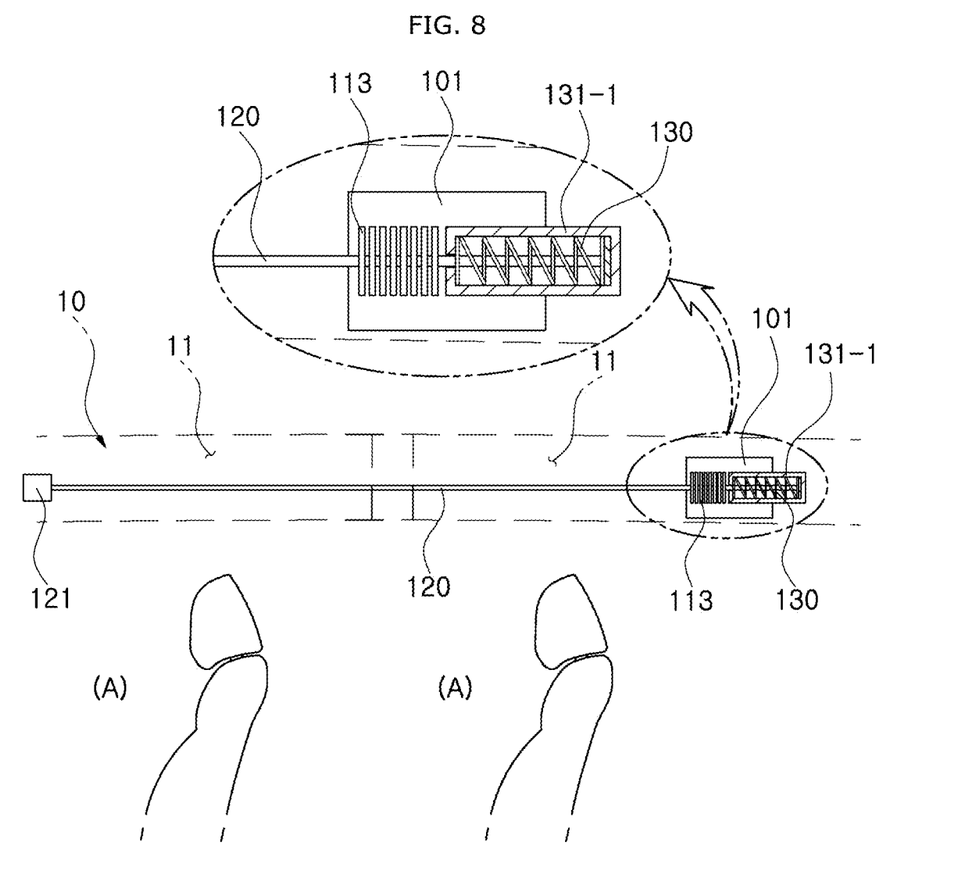
FIG. 8 is a side view illustrating that the length of a deployment resistance reducer is decreased while a cushion of a roof airbag apparatus in accordance with another embodiment of the present disclosure is not deployed.
Figure 9:
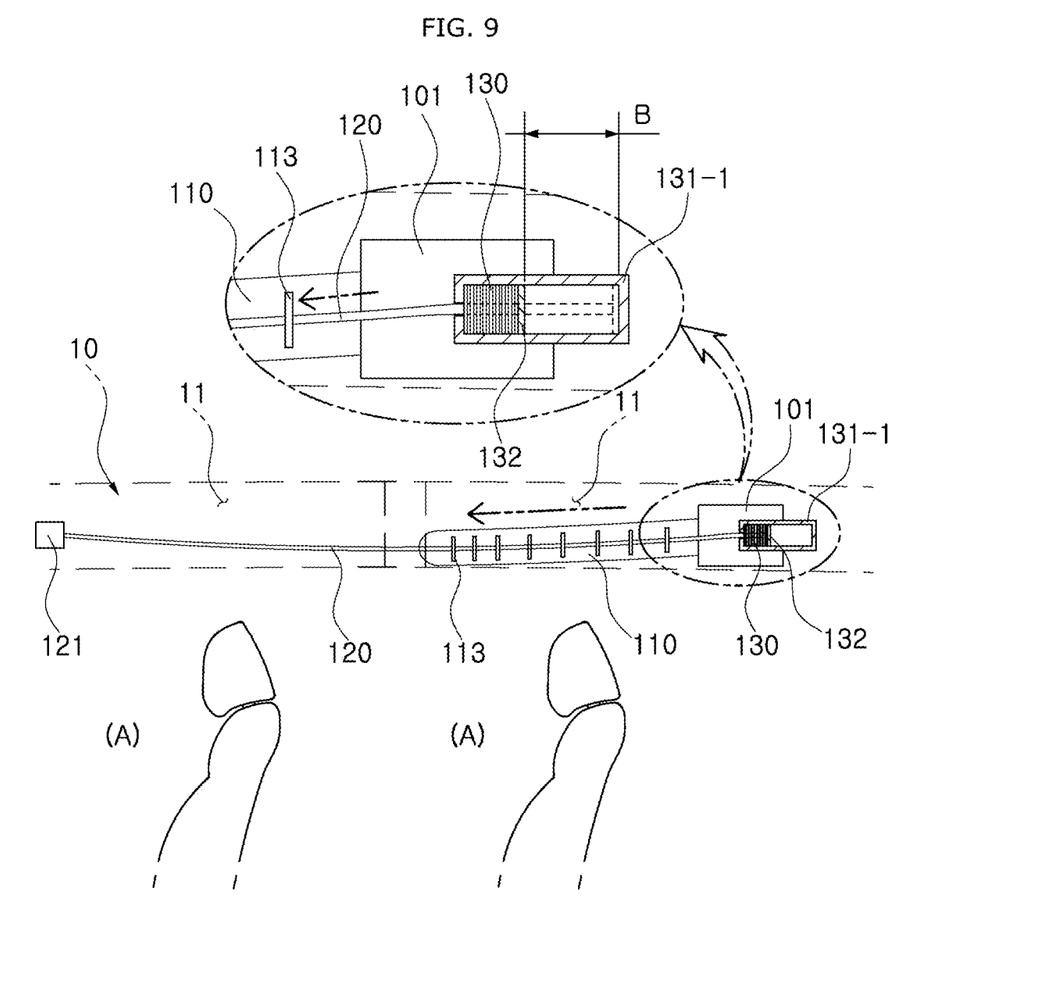
FIG. 9 is a side view illustrating that the length of the deployment resistance reducer is increased while the cushion of the roof airbag apparatus in accordance with the another embodiment of the present disclosure is deployed.

FIG. 8 is a side view illustrating that the length of a deployment resistance reducer is decreased while a cushion of a roof airbag apparatus in accordance with another embodiment of the present disclosure is not deployed, and FIG. 9 is a side view illustrating that the length of the deployment resistance reducer is increased while the cushion of the roof airbag apparatus in accordance with the another embodiment of the present disclosure is deployed.

Figure 10:
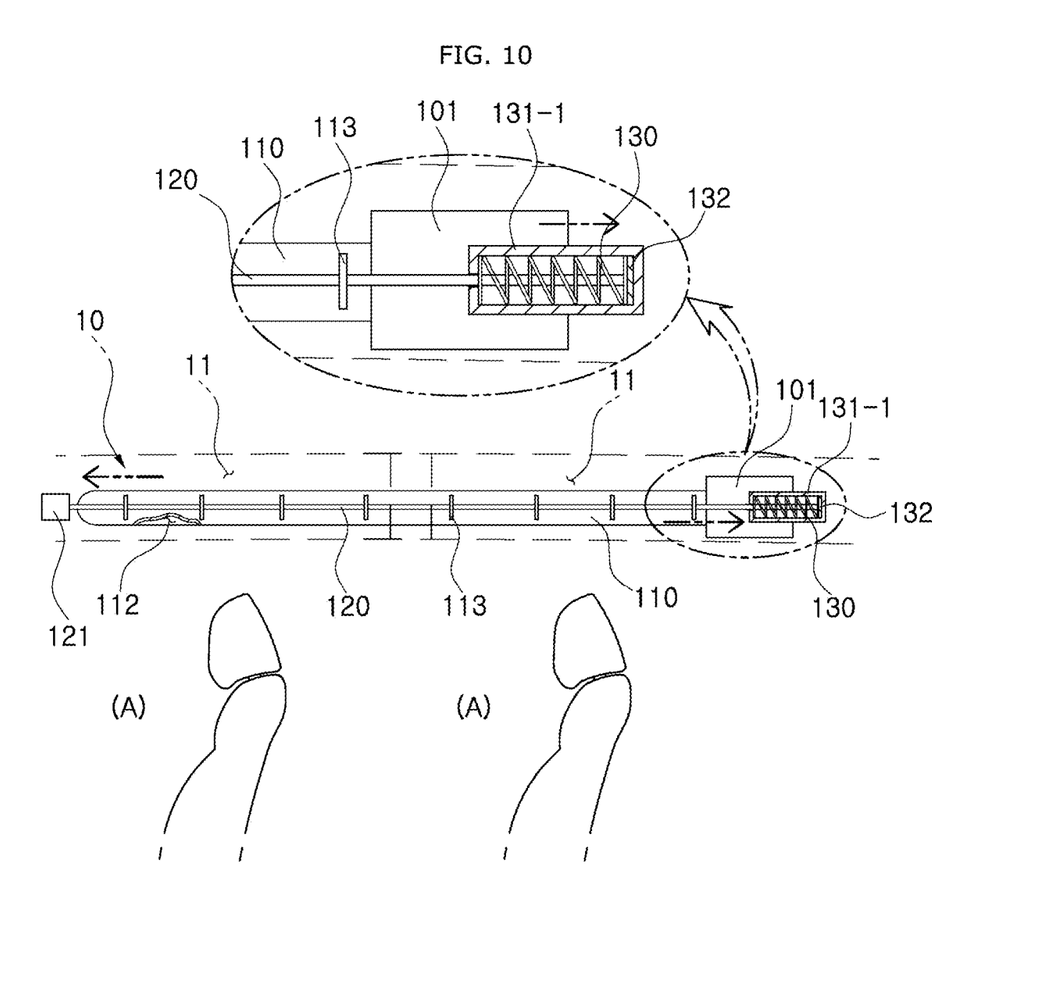
FIG. 10 is a side view illustrating that the length of the deployment resistance reducer is decreased after the cushion of the roof airbag apparatus in accordance with the another embodiment of the present disclosure has been completely deployed.
Figure 11:
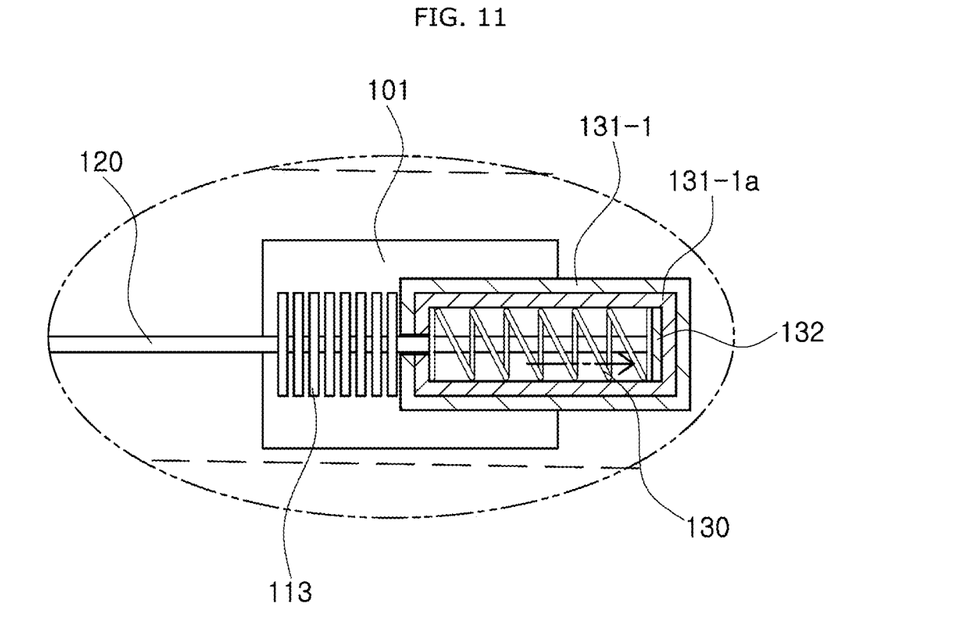
FIG. 11 is a side cross-sectional view illustrating that an impact absorber is formed in a guide housing of the roof airbag apparatus in accordance with the another embodiment of the present disclosure.

FIG. 10 is a side view illustrating that the length of the deployment resistance reducer is decreased after the cushion of the roof airbag apparatus in accordance with the another embodiment of the present disclosure has been completely deployed, and FIG. 11 is a side cross-sectional view illustrating that an impact absorber is formed in a guide housing of the roof airbag apparatus in accordance with the another embodiment of the present disclosure.

As illustrated in FIGS. 1 to 11, a roof airbag apparatus 100 in accordance with an embodiment of the present disclosure includes a cushion 110, a pair of guides 120 and a deployment resistance reducer 130.

The cushion 110 may be deployed forward to cover an open space of a roof 11, when gas is supplied from the outside, and a discharge part of an inflator 20 for supplying inflation gas G may be coupled to the rear of the cushion 110.

Such a cushion 110 is deployed toward the front from the rear of the vehicle 10 and covers the open space of the roof 11, when gas is supplied into the cushion 110. The cushion 110 may be deployed toward the rear from the front of the vehicle 10

The cushion 110 may have a filling space 112 to be filled with the gas G supplied from the inflator 20, and the filling space 112 may be divided into one or more spaces to communicate with each other.

The cushion 110 may have an inlet 111 formed at a rear end thereof so as to communicate with the filling space 112, the inlet 111 being connected to the discharge part of the inflator 20. The filling space 112 forms a moving path of the gas G injected through the inlet at the rear of the cushion 110 from the inflator 20.

Furthermore, the cushion 110 may further include a plurality of guide rings 113 formed on either side thereof so as to slide along a guide 120 which will be described below, and each of the guide rings 113 may have a fastening hole formed therethrough in the front-to-rear direction such that the guide 120 can be coupled to the fastening hole.

As illustrated in FIGS. 1 and 2, the volume of the cushion 110 may be reduced so that the cushion 110 is housed in a case 101 installed adjacent to the space of the roof 11, and the case 101 may be installed at various locations, if necessary.

The inflator 20 may be ignited through a method of igniting gun powder of an igniter (not illustrated) according to a sensing signal of a shock sensor, and then generate gas.

The cushion 110 is deployed to block the space of the roof 11, such that a passenger positioned in a passenger space A under the roof 11 is prevented from being thrown out of the vehicle to the outside through the space of the roof 11 in case of a rollover accident.

The pair of guides 120 serve to guide the cushion 110 in a deployment direction, and each have a length in the deployment direction of the cushion 110.

The guides 120 may be disposed on the left and right sides of the space of the roof 11, respectively, and made of a fabric or metallic wire to be deformed.

As illustrated in FIGS. 2 to 9, the guide 120 has a front end fixedly coupled to a structure of the vehicle and a rear end coupled to the deployment resistance reducer 130 which will be described below.

The front end of the guide 120 may be fixed by a separate fixing member 121, the guide 120 may be coupled through the fastening holes of the guide rings 113 coupled to either side of the cushion 110, and the guide rings 113 may be slid in the longitudinal direction of the guide 120.

The deployment resistance reducer 130 serves to prevent the guide 120 from being damaged by frictional resistance when the cushion 110 is deployed, and is connected to one end of the guide 120 so as to apply a tensile elastic force toward the rear.

As illustrated in FIGS. 4 to 5, While the cushion 110 is deployed in case of a vehicle accident, a connector 133 connected to the one end of the guide 120 applies a tensile elastic force from a first location (see FIG. 4) toward the rear. When the cushion 110 is deployed, the connector 133 is moved to a second location (see FIG. 5) in the front of the first location by the frictional resistance applied to the guide 120, thereby reducing the tension of the guide 120.

As illustrated in FIG. 5, That is, while the tensile elastic force of the deployment resistance reducer 130 is overcome by the frictional resistance applied to the guide 120, the guide 120 may be loosed. That is, the tension of the guide 120 may be reduced.

As illustrated in FIG. 6, When the cushion 110 is completely deployed, the deployment resistance reducer 130 applies a tensile elastic force toward the rear, and restores the tension of the guide 120 to the original tension.

As illustrated in FIGS. 3 to 6, the rear end of the deployment resistance reducer 130 in accordance with the embodiment of the present disclosure may be fixed, and the connector 133 at the front of the deployment resistance reducer 130 may be connected to one end of the guide 120, and apply a tensile elastic force toward the rear.

In this case, the length of the deployment resistance reducer 130 may be increased toward the front as illustrated in FIG. 5 when the cushion 110 is deployed, and restored to the original length by a tensile elastic force as illustrated in FIG. 6 when the cushion 110 is completely deployed.

For this operation, a coil-shaped tensile spring may be used as the deployment resistance reducer 130, and the deployment resistance reducer 130 may be disposed in a guide housing 131 whose front side is open, as illustrated in FIGS. 3 to 6. The rear end of the deployment resistance reducer 130 may be fixed to the guide housing 131.

The guide housing 131 in accordance with the embodiment of the present disclosure may be fixedly installed in a structure of a vehicle 10, and has an installation space formed therein. The installation space may be open to the front such that the deployment resistance reducer 130 is disposed in the guide housing 131.

The guide housing 131 or the inner circumferential surface of the guide housing 131 may be made of a material capable of absorbing vibration and noise, and the installation space of the guide housing 131 may have a shape corresponding to the deployment resistance reducer 130.

When the cushion 110 is deployed due to a vehicle accident, the front end of the deployment resistance reducer 130 may appear and disappear through the open front of the guide housing 131 as illustrated in FIGS. 5 and 6.

The guide housing 131 in accordance with the embodiment of the present disclosure may be installed to cover the deployment resistance reducer 130 in the longitudinal deformation direction and the orthogonal direction, and the deployment resistance reducer 130 may be supported in the installation space of the guide housing 131.

As illustrated in FIG. 7, The guide housing 131 may further include an impact absorption layer 131a formed in the installation space thereof, the impact absorption layer 131a being made of an elastic material (rubber, resin or the like). The impact absorption layer 131a may support the outside of the deployment resistance reducer 130.

That is, since the installation space of the guide housing 131 supports the outside of the deployment resistance reducer 130, the movement of the deployment resistance reducer 130 may be prevented. When the impact absorption layer 131a is formed in the installation space of the guide housing 131, the impact absorption layer 131a may absorb vibration and noise of the deployment resistance reducer 130.

As illustrated in FIGS. 8 to 11, the front end of the deployment resistance reducer 130 in accordance with another embodiment of the present disclosure may be fixed, and the rear end thereof may be connected to one end of the guide 120, and apply a compressive elastic force toward the rear.

In this case, the length of the deployment resistance reducer 130 may be decreased toward the front as illustrated in FIG. 9 when the cushion 110 is deployed, and restored to the original length by a compressive elastic force as illustrated in FIG. 10 when the cushion 110 is completely deployed.

For this operation, a coil-shaped compression spring may be used as the deployment resistance reducer 130, and the deployment resistance reducer 130 may be disposed in a guide housing 131-1, as illustrated in FIGS. 8 to 11.

At this time, the front end of the deployment resistance reducer 130 may be disposed while supported by the inside of the guide housing 131-1, and the rear end of the deployment resistance reducer 130 may be compressed in the front-to-rear direction and elastically restored toward the rear.

The guide housing 131-1 or the inner circumferential surface of the guide housing 131-1 may be made of a material capable of absorbing vibration and noise, and the installation space of the guide housing 131-1 may have a shape corresponding to the deployment resistance reducer 130.

The guide housing 131-1 in accordance with the another embodiment of the present disclosure may be installed to cover the deployment resistance reducer 130 in the longitudinal deformation direction and the orthogonal direction, and the deployment resistance reducer 130 may be supported in the installation space of the guide housing 131-1.

As illustrated in FIG. 11, The guide housing 131-1 may further include an impact absorption layer 131-1a formed in the installation space thereof, the impact absorption layer 131-1a being made of an elastic material (rubber, resin or the like). The impact absorption layer 131-1a may support the outside of the deployment resistance reducer 130.

That is, since the installation space of the guide housing 131-1 supports the outside of the deployment resistance reducer 130, the movement of the deployment resistance reducer 130 may be prevented. When the impact absorption layer 131-1a is formed in the installation space of the guide housing 131-1, the impact absorption layer 131-1a may absorb vibration and noise of the deployment resistance reducer 130.

The deployment resistance reducer 130 in accordance with the another embodiment of the present disclosure may include a locking member 132 locked to a connector 133-1 at the rear thereof so as to move in the front-to-rear direction.

At this time, one end of the guide 120 may be connected to the locking member 132 through the deployment resistance reducer 130. When the deployment resistance reducer 130 is applied as a coil spring, the guide may pass through the coil spring toward the rear.

As illustrated in FIGS. 4 to 6, the connector 133 of the deployment resistance reducer 130 in accordance with the embodiment of the present disclosure refers to the front end of the deployment resistance reducer 130 connected to the one end of the guide 120, and the position of the connector 133 may be changed to various positions other than the front end, if necessary.

On the other hand, as illustrated in FIGS. 8 and 11, the connector 133-1 of the deployment resistance reducer 130 in accordance with the another embodiment of the present disclosure refers to the rear end of the deployment resistance reducer 130 connected to the one end of the guide 120, and the position of the connector 133-1 may be changed to various positions other than the rear end, if necessary.

Hereafter, a deployment process of the roof airbag apparatus in accordance with the embodiment of the present disclosure in case of a rollover accident and a head-on collision accident of a vehicle will be described below with reference to FIGS. 1 to 11.

In the roof airbag apparatus in accordance with the embodiment of the present disclosure, the guide 120 maintains a straight line shape in the longitudinal direction while maintaining predetermined tension through a tensile elastic force of the deployment resistance reducer 130 as illustrated in FIG. 4, and the connector 133 of the deployment resistance reducer 130 is connected to one end of the guide 120 at the first location, and applies a tensile elastic force toward the rear.

When a rollover accident occurs, the inflator 20 is operated according to a sensing signal transferred from a rollover sensor (not illustrated) as illustrated in FIG. 5, and the cushion 110 is deployed by gas supplied from the inflator 20.

During this process, the guide ring 113 of the cushion 110 is slid forward in the longitudinal direction of the guide 120, and a force is applied to the front of the guide 120 by frictional resistance which is generated when the guide ring 113 is moved.

At this time, the length of the deployment resistance reducer 130 is increased while the connector 133 of the deployment resistance reducer 130 protrudes toward the front of the guide housing 131 by a moving distance B, and the guide 120 is loosed while the tension of the guide 120 in the longitudinal direction is reduced by the increase in length of the deployment resistance reducer 130.

That is, while the cushion 110 is deployed at the initial stage, the connector 133 of the deployment resistance reducer 130 is extended from the first location to the second location by a predetermined length in the deployment direction of the cushion 110. Accordingly, since the guide 120 becomes loose, frictional resistance can be reduced when the guide ring 113 moves on the guide 120. Thus, it is possible to reduce the frictional resistance between the guide ring 113 and the guide 120 when the cushion 110 is deployed at the initial stage.

Then, when the cushion 110 is completely deployed, the cushion 110 blocks the space of the roof 11, and the length of the deployment resistance reducer 130 is decreased to the original length by the tensile elastic force, as illustrated in FIG. 6. Furthermore, as the length of the deployment resistance reducer 130 is decreased, the guide 120 maintains a straight line shape in the longitudinal direction while maintaining predetermined tension.

In the roof airbag apparatus in accordance with the another embodiment of the present disclosure, the guide 120 maintains a straight line shape in the longitudinal direction while maintaining predetermined tension through the compressive elastic force of the deployment resistance reducer 130 in a state where the cushion 110 is not deployed as illustrated in FIG. 8.

When a rollover accident occurs, the inflator 20 is operated according to a sensing signal transferred from a rollover sensor (not illustrated) as illustrated in FIG. 9, and the cushion 110 is deployed by gas supplied from the inflator 20.

During this process, the guide ring 113 of the cushion 110 is slid forward in the longitudinal direction of the guide 120, and a force is applied toward the front of the guide 120 by frictional resistance which is generated when the guide ring 113 is moved.

At this time, the guide 120 leads the locking member 132 toward the front, the length of the deployment resistance reducer 130 is decreased while the rear end of the deployment resistance reducer 130 is compressed forward by the movement of the locking member 132, and the tension of the guide 120 in the longitudinal direction is reduced by the decrease in length of the deployment resistance reducer 130.

That is, while the cushion 110 is deployed at the initial stage, the deployment resistance reducer 130 is reduced by a predetermined length in the deployment direction of the cushion 110. Accordingly, since the guide 120 becomes loose, frictional resistance can be reduced when the guide ring 113 moves on the guide 120. Thus, it is possible to reduce the frictional resistance between the guide ring 113 and the guide 120 when the cushion 110 is deployed at the initial stage.

Then, when the cushion 110 is completely deployed, the cushion 110 blocks the space of the roof 11, and the length of the deployment resistance reducer 130 is restored to the original length by the tensile elastic force, as illustrated in FIG. 10. Furthermore, as the length of the deployment resistance reducer 130 is increased, the guide 120 maintains a straight line shape in the longitudinal direction while maintaining predetermined tension.

The roof airbag apparatus in accordance with the embodiments of the present disclosure may reduce the frictional resistance between the guide 120 and the guide ring 113 when the cushion 110 is deployed, thereby prevent damage to the guide due to the deployment of the cushion 110. Furthermore, the guide housing 131 or 131-1 and the impact absorption layer 131a or 131-1a may be formed on the outside of the deployment resistance reducer 130, thereby not only preventing the movement of the deployment resistance reducer 130, but also reducing noise and impact caused by the movement.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:
1. A roof airbag apparatus comprising:
a cushion configured to cover a roof when deployed;
a pair of guides having a length in the deployment direction of the cushion, and configured to guide both sides of the cushion in the deployment direction; and
a deployment resistance reducer having a connector connected to one end of each of the guides so as to apply an elastic force from a first location toward the rear, wherein the connector is moved to a second location in a front of the first location by frictional resistance which is applied to the guide when the cushion is deployed.

2. The roof airbag apparatus of claim 1, wherein the deployment resistance reducer applies a restoring elastic force toward the rear such that the connector is restored from the second location to the first location.

3. The roof airbag apparatus of claim 2, wherein the deployment resistance reducer has a fixed rear end and a front end connected to one end of the guide, and applies a tensile elastic force toward the rear.

4. The roof airbag apparatus of claim 3, wherein the length of the deployment resistance reducer is increased toward the front when the cushion is deployed, and restored to the original length by the tensile elastic force when the cushion is completely deployed.

5. The roof airbag apparatus of claim 4, wherein the deployment resistance reducer is disposed in a guide housing whose front is open.

6. The roof airbag apparatus of claim 5, wherein the guide housing further comprises an impact absorption layer formed therein, the impact absorption layer being made of an elastic material.

7. The roof airbag apparatus of claim 2, wherein the deployment resistance reducer has a fixed front end and a rear end connected to one end of the guide, and applies a compressive elastic force toward the rear.

8. The roof airbag apparatus of claim 7, wherein the length of the deployment resistance reducer is decreased toward the front when the cushion is deployed, and restored to the original length by the compressive elastic force when the cushion is completely deployed.

9. The roof airbag apparatus of claim 8, wherein the deployment resistance reducer is disposed in a guide housing, while the front end thereof is supported.

10. The roof airbag apparatus of claim 9, wherein a locking member is locked to a rear end of the deployment resistance reducer so as to move in a front-to-rear direction, and the guide has one end connected to the locking member through the deployment resistance reducer.

11. The roof airbag apparatus of claim 9, wherein the guide housing further comprises an impact absorption layer formed therein, the impact absorption layer being made of an elastic material.

12. The roof airbag apparatus of claim 1, wherein the cushion further comprises guide rings which are disposed on either side of the cushion so as to be slidable along the guide.

\* \* \* \* \*